United States Patent
Inoue et al.

(10) Patent No.: US 11,954,512 B2
(45) Date of Patent: Apr. 9, 2024

(54) CONTROL DEVICE AND CONTROL METHOD

(71) Applicant: Nippon Telegraph and Telephone Corporation, Tokyo (JP)

(72) Inventors: Satomi Inoue, Tokyo (JP); Masayuki Nishiki, Tokyo (JP); Hiroshi Osawa, Tokyo (JP); Takayuki Fujiwara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 598 days.

(21) Appl. No.: 17/262,307

(22) PCT Filed: Jul. 26, 2019

(86) PCT No.: PCT/JP2019/029494
§ 371 (c)(1),
(2) Date: Jan. 22, 2021

(87) PCT Pub. No.: WO2020/026993
PCT Pub. Date: Feb. 6, 2020

(65) Prior Publication Data
US 2021/0303332 A1 Sep. 30, 2021

(30) Foreign Application Priority Data
Jul. 30, 2018 (JP) .................. 2018-142727

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01); *G06F 2009/45595* (2013.01)

(58) Field of Classification Search
CPC .............. G06F 9/45558; G06F 9/5077; G06F 2009/4557; G06F 2009/45595
See application file for complete search history.

(56) References Cited

U.S. PATENT DOCUMENTS 9,760,428 B1* 9/2017 Felstaine ............... H04W 28/00
2016/0366014 A1* 12/2016 Koo .................... G06F 9/45558
(Continued)

OTHER PUBLICATIONS

Cloud.nifty.com, [online], "Nifkula Specifications and Functions," 2018, retrieved on Jun. 13, 2018, retrieved from URL<https://cloud.nifty.com/service/autoscale.htm>, 10 pages (with English Translation).

(Continued)

*Primary Examiner* — Dong U Kim
(74) *Attorney, Agent, or Firm* — Fish & Richardson P.C.

(57) ABSTRACT

A control system (10) includes, for each type of Virtual Network Function (VNF), a VNF compatibility condition indicating a condition of allocation of resources by which the VNF corresponding to the type is allowed to coexist with other VNFs in an identical computer, and resource usage information indicating resources in use by the VNF in the computer and unused resources. The control system (10) includes a VNF deploy control unit (14) referencing, in a case of receiving an instruction to additionally install a VNF, the type of the VNF to be additionally installed, the VNF compatibility condition, and the resource usage information to determine, from among the unused resources, resources allocated to the VNF to be additionally installed, and a resource allocation processing unit allocating the determined resources to the VNF to be additionally installed.

10 Claims, 9 Drawing Sheets

(56) References Cited

U.S. PATENT DOCUMENTS

| | | | | |
|---|---|---|---|---|
| 2017/0223035 | A1* | 8/2017 | Watanabe | H04L 41/0897 |
| 2017/0329644 | A1* | 11/2017 | Imamura | G06F 9/505 |
| 2018/0024852 | A1* | 1/2018 | Yabushita | G06F 9/50 |
| | | | | 718/1 |
| 2020/0044919 | A1* | 2/2020 | Yao | H04L 41/0806 |
| 2020/0334065 | A1* | 10/2020 | Wang | H04L 43/0817 |

OTHER PUBLICATIONS

Docs.microsoft.com, [online], "How to configure an automatic scale for cloud services with a portal," May 18, 2017, retrieved on Dec. 22, 2017, retrieved from URL<https://docs.microsoft.com/ja-jp/azure/cloud-services/cloud-services-how-to-scale-portal>, 11 pages (with English Translation).

\* cited by examiner

| VNF COMPATIBILITY CONDITION |||||
|---|---|---|---|---|
| VNF TYPE | SHARE NIC WITH OTHER VNFS | NIC SUPPORTING SR-IOV | NUMA SPANNING | ... |
| VNF#1 | DENY | REQUIRE (10G) | DENY | ... |
| VNF#2 | ALLOW | REQUIRE (1G) | PERMIT | ... |

| VNF COMPATIBILITY CONDITION FOR vMX ||
|---|---|
| vmx.conf | SPECIFY, AS HOST-MANAGEMENT-INTERFACE, NIC DIFFERENT FROM PHYSICAL NIC USED BY vSR |
| vmx.sh | DEFINE MAINTENANCE NETWORK ADDRESS TO INCLUDE DOMAIN DIFFERENT FROM DOMAIN FOR vSR SIDE TO PREVENT POSSIBLE ERROR DURING EXECUTION |
| VNF COMPATIBILITY CONDITION FOR vSR ||
| XML FILE FOR CP | SPECIFY <seclabel type = 'none' model = 'none'/> |
| XML FILE FOR DP | DELETE <driver name = 'vfio'/> FROM PCI Passthrough CONFIGURATION |
| IF ALLOCATED TO DP | CAUSE OPERATION IN PROMISCUOUS MODE |

CONTROL DEVICE AND CONTROL METHOD

CROSS-REFERENCE TO RELATED APPLICATIONS

This application is a National Stage application under 35 U.S.C. § 371 of International Application No. PCT/JP2019/029494, having an International Filing Date of Jul. 26, 2019, which claims priority to Japanese Application Serial No. 2018-142727, filed on Jul. 30, 2018. The disclosure of the prior application is considered part of the disclosure of this application, and is incorporated in its entirety into this application.

TECHNICAL FIELD

The present disclosure relates to a control device and a control method.

BACKGROUND ART

Examples of techniques for traffic monitoring and traffic analysis include one utilizing a flow collector such as netFlow. The flow collector monitors traffic in units of destination addresses. When the flow collector detects suspected attack traffic, a control device draws the traffic into a Virtual Network Function (VNF) for attack traffic and analyzes the traffic in detail. Note that, for example, vRouter and vMitigation are used as the VNF for attack traffic described above. Here, when suspected attack traffic is detected, the control device needs to additionally install (scale-out) a VNF according to the amount of traffic to be drawn in.

Here, when performing VNF scale-out, resources allowing the performance of the VNFs to be maintained (for example, CPUs, memories, NICs, or the like in a physical layer) need to be allocated with compatibility between the VNFs (VNF compatibility condition) taken into account.

CITATION LIST

Non Patent Literature

NPL 1: NIFCLOUD, [Search on Jul. 9, 2018], Internet <URL: https://cloud.nifty.com/service/autoscale.htm>
NPL 2: How to configure auto scaling for a Cloud Service in the portal, [Search on Jul. 9, 2018], Internet <URL: https://docs.microsoft.com/ja-jp/azure/cloud-services/cloud-services-how-to-scale-portal>

SUMMARY OF THE INVENTION

Technical Problem

However, no technology has been proposed in which, when the VNF is scaled out, resources are automatically allocated to the VNF with the VNF compatibility condition taken into account. Thus, when the VNF is scaled out, a system operator or the like needs to perform manual tuning for allocation of resources to the VNF. Thus, an object of the present disclosure is to appropriately and automatically allocate resources to the VNF when the VNF is scaled out.

Means for Solving the Problem

In order to achieve the object described above, the present disclosure provides a control device for performing, when a plurality of Virtual Network Functions (VNFs) are additionally installed on a single computer, allocation of a plurality of resources of the single computer to a first VNF of the plurality of VNFs to be additionally installed, the control device including a storage unit configured to store, in a unit of a type of the first VNF, a VNF compatibility condition indicating a condition for allocation of first resources of the plurality of resources allowed for the first VNF corresponding to the type to coexist with a second VNF of the plurality of VNFs in the single computer, and resource usage information indicating second resources of the plurality of resources that are used by the second VNF in the single computer and unused resources of the plurality of resources in the single computer, a VNF control unit configured to, in a case of receiving an additional installation instruction including a resource amount needed for the additional installation of the first VNF, reference the type of the first VNF to be additionally installed, the VNF compatibility condition, and the resource usage information to determine, from among the unused resources, allocation resources of the plurality of resources allocated to the first VNF to be additionally installed, the allocation resources satisfying the VNF compatibility condition, and a resource allocation processing unit configured to allocate the allocation resources that are determined to the first VNF to be additionally installed.

Effects of the Invention

According to the present disclosure, when the VNF is scaled out, resource allocation to the VNF can be automatically and appropriately performed.

DESCRIPTION OF EMBODIMENTS

Hereinafter, modes (embodiments) for carrying out the present disclosure will be described with reference to the drawings. The present disclosure is not limited to the embodiments.

Overview

First, an overview of a control device (control system) of the present embodiment will be described with reference to FIG. 1. Note that, in the following description, the control system is implemented, for example, by a virtual infrastructure that controls a plurality of VNFs. Units of the control system may be equipped in one device (e.g., a server) or may be equipped in separate devices.

The control system 10 in the present embodiment manages and controls the VNFs, and additionally installs a VNF (scale-out) as necessary. Here, a case in which the control system 10 additionally installs a VNF 2 will be described as an example.

Note that, in the following description, each VNF (VNF 1 and VNF 2) is built into the identical computer (control system 10). In other words, the VNF 2 to be additionally installed is constructed by a VM (virtual machine) in the identical computer. Each VM is implemented by a hypervisor (HV), a physical layer (core, memory, Network Interface Card (NIC), and the like) in the control system 10.

Note that VNF is, for example, a virtual router or the like. This virtual router transfers traffic drawn from outside. For example, the VNF 1 on a VM #1 in the control system 10 illustrated in FIG. 1 executes transfer processing for the traffic drawn from outside.

Here, the control system 10, for example, monitors traffic input to the VNF 1 (type: VNF #1) and when detecting attack traffic, additionally installs a VNF of the VNF #1 on a VM #2 to process the attack traffic.

For example, a flow collector unit 11 in the control system 10 monitors traffic of the VNF 1 (S1), and when detecting attack traffic, notifies a resource control unit 12 of the detection (S2). The resource control unit 12 receives the notification and instructs an orchestrator unit 13 to additionally install resources (S3). In other words, the resource control unit 12 instructs the orchestrator unit 13 to additionally install a VNF of the VNF #1.

After S3, the orchestrator unit 13 instructs a VNF deploy control unit (VNF control unit) 14 to give an instruction to allocate resources (S4) on the basis of a template in a DB (database). In other words, the orchestrator unit 13 instructs the VNF deploy control unit 14 to allocate resources (for example, cores, memories, NICs, and the like) used for the VNF to be additionally installed, on the basis of the template. Note that the template indicates, for each type of VNF, a region of the VM used for the VNF corresponding to the type (for example, cores, memories, NICs, and the like in the physical layer), configuration information needed to activate the VNF corresponding to the type, and the like.

Subsequently, the VNF deploy control unit 14 determines optimal physical resource conditions allocated to the VNF to be additionally installed on the basis of VNF compatibility condition in the DB. The VNF compatibility condition is information indicating, for each type of VNF, a condition for allocation of resources by which the VNF corresponding to the type is allowed to coexist with other VNFs in the identical computer. For example, in a case where the VNF is a virtual router, the VNF compatibility condition indicates that "no NIC is shared with any other VNF (virtual router)". Details of the VNF compatibility condition will be described below using specific examples.

For example, the VNF deploy control unit 14 determines the optimal physical resource conditions for the VNF to be additionally installed (VNF 2) on the basis of the VNF compatibility condition. Then, on the basis of the result of the above-described determination, the VNF deploy control unit 14 gives, to a Virtualized Infrastructure Manager (VIM) 15, an instruction related to the optimal physical resources for the VNF to be additionally installed (S5). The VIM 15 then allocates resources (e.g., cores, memories, NICs, and the like) to the VNF 2 on the basis of the instruction (S6). For example, the VNF deploy control unit 14 instructs the VIM 15 to allocate the NF2 with an NIC not used by the VNF 1. Then, the VIM 15 allocates the VNF 2 with an NIC not used by the VNF 1.

After S6, the orchestrator unit 13 configures each VNF (VNF 1 and VNF 2) on the basis of a VNF configuration file (e.g., a file indicating configuration of a physical layer of a VNF of the VNF #1, an Image file installed on each VNF, and the like) (S7).

This allows the control system 10 to achieve scale-out of a VNF that satisfies the VNF compatibility condition.

Configuration

Continuing with FIG. 1, the configuration of the control system 10 will be described. The control system 10 includes the flow collector unit 11, the resource control unit 12, the orchestrator unit 13, the VNF deploy control unit 14, and the VIM 15.

The flow collector unit 11 collects and monitors traffic. The flow collector unit 11, for example, collects, from a VNF, traffic input to the VNF and monitors the traffic. Then, when detecting attack traffic, the flow collector unit 11 notifies the resource control unit 12 of the detection.

The resource control unit 12 determines whether to additionally install a VNF, for example. For example, when receiving, from the flow collector unit 11, a notification that the attack traffic has been detected and determining that the existing VNF is insufficient to process the attack traffic, the resource control unit 12 instructs the orchestrator unit 13 to additionally install a VNF.

The orchestrator unit 13 performs activation of VNFs, configuration for the VNFs, management of the VNFs, and the like. For example, when receiving, from the resource control unit 12, an instruction to additionally install a VNF, the orchestrator unit 13 instructs the VNF deploy control unit 14 to allocate resources used by the VNF to be additionally installed (for example, a core, a memory, an NIC, or the like) on the basis of the template in the DB of the orchestrator unit 13.

Figure 2:
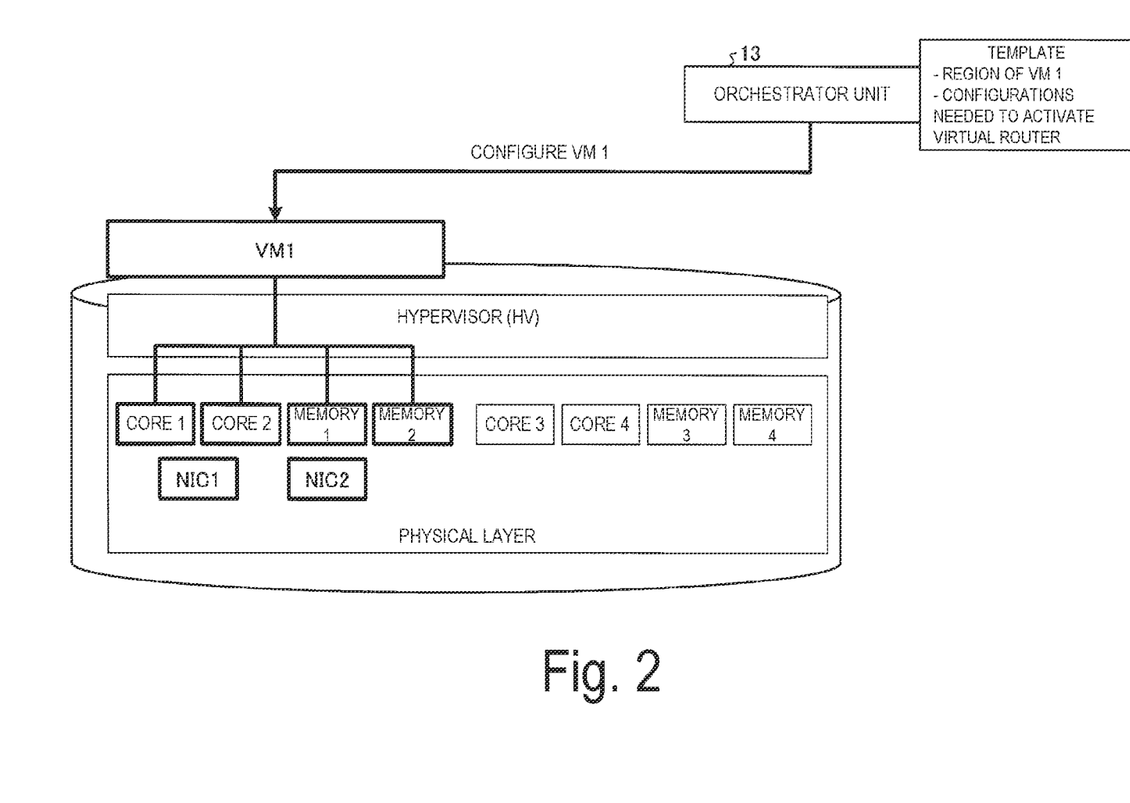
FIG. 2 is a diagram illustrating an example of a template in FIG. 1.

As described above, the above-described template indicates a region of the VM used for a VNF and configuration information needed to activate the VNF. For example, in a case where the VNF is a virtual router, the template describes a region of the VM 1 used for the virtual router, configurations needed to activate the virtual router, as illustrated in FIG. 2. With reference to the above-described template, for example, the orchestrator unit 13 can allocate cores 1 and 2, NICs 1 and 2, and memories 1 and 2 for the VM 1, and provide, on the VM 1, configurations for activating the virtual router.

Figure 1:
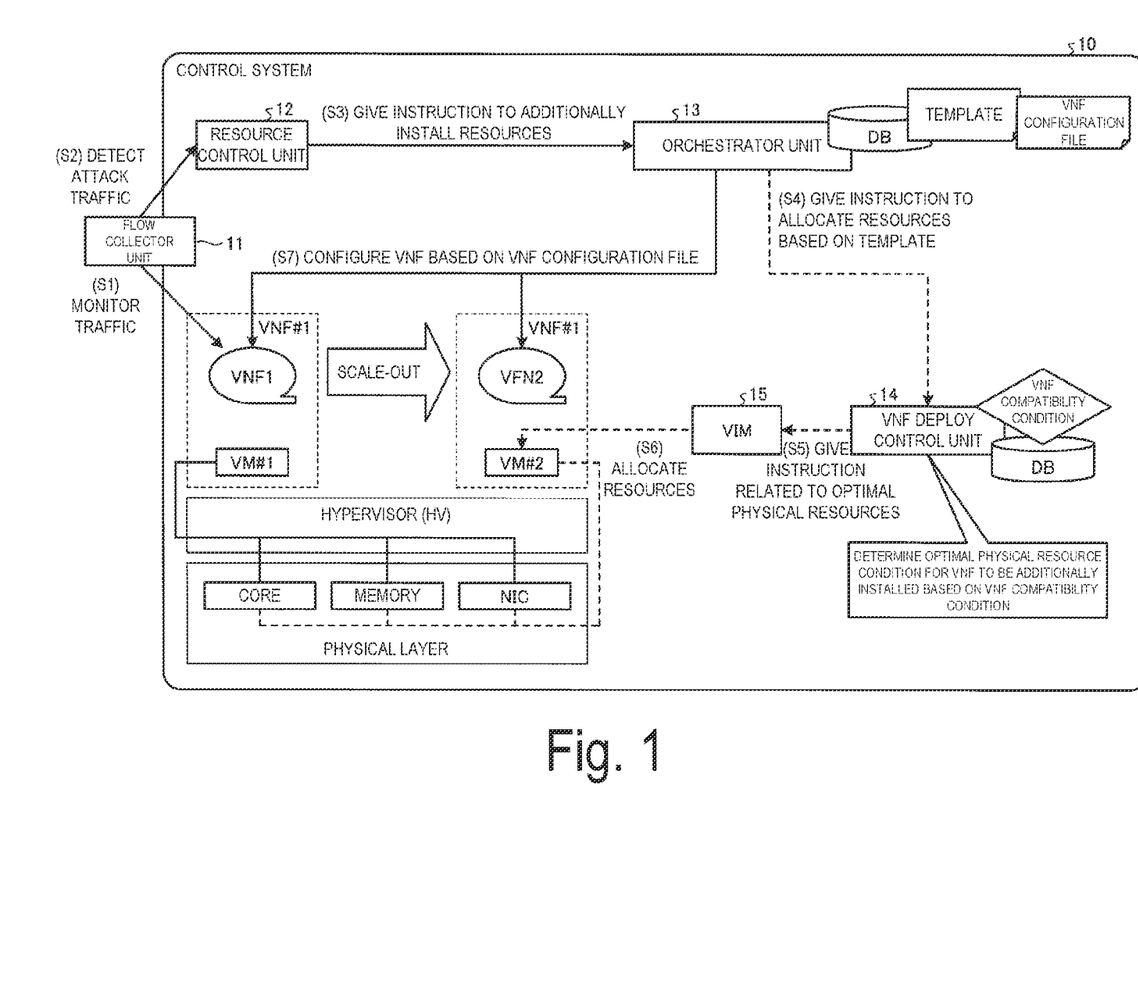
FIG. 1 is a diagram illustrating a configuration example and an overview of a control system.
Figure 3:
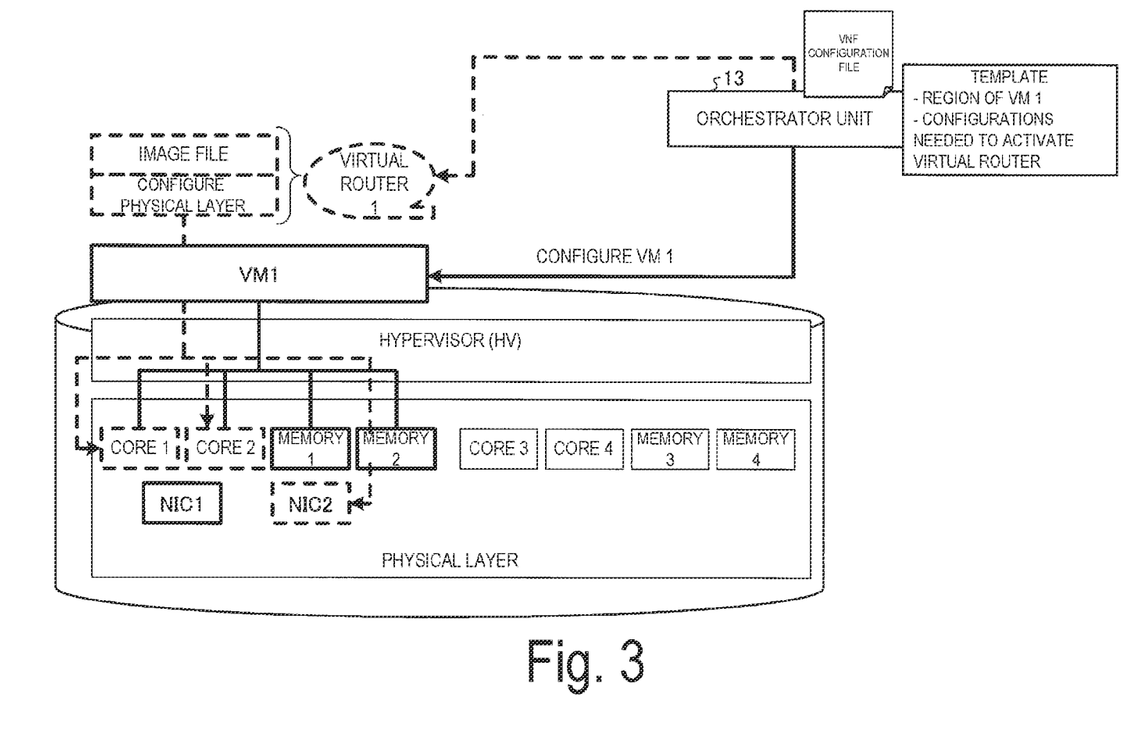
FIG. 3 is a diagram illustrating an example of a VNF configuration file in FIG. 1.

The orchestrator unit 13 in FIG. 1 configures the VNF on the basis of the VNF configuration file in the DB of the orchestrator unit 13. For example, the orchestrator unit 13 configures the physical layer, install the Image file, and the like on the basis of the VNF configuration file on the resource-allocated VNF By way of example, as illustrated in FIG. 3, the orchestrator unit 13 configures, to the VM 1 configured in FIG. 2, the physical layer of the virtual router 1 (configures the cores 1 and 2 and the NIC 2) and installs the Image file, on the basis of the VNF configuration file. This allows the virtual router 1 to be activated.

Note that the above-described template and VNF configuration file may be stored in a DB of a storage unit (not illustrated) provided in the orchestrator unit 13, or stored in a storage device outside the orchestrator unit 13.

In response to receiving an instruction to additionally install the resources, the VNF deploy control unit 14 references the VNF compatibility condition in the DB of the VNF deploy control unit to determine the optimal physical resource conditions for the VNF to be additionally installed. The VNF deploy control unit 14 provides the VIM 15 with an instruction related to physical resources allocated to the VNF to be additionally installed, on the basis of the result of the determination of the optimal physical resource conditions for the VNF to be additionally installed. The VNF deploy control unit 14 will be described below in detail using specific examples.

Note that, as described above, the VNF compatibility condition indicates, for each type of VNF, a condition for allocation of resources (for example, cores, memories, NICs, and the like) that can coexist with other VNFs in the identical computer.

Figure 4:
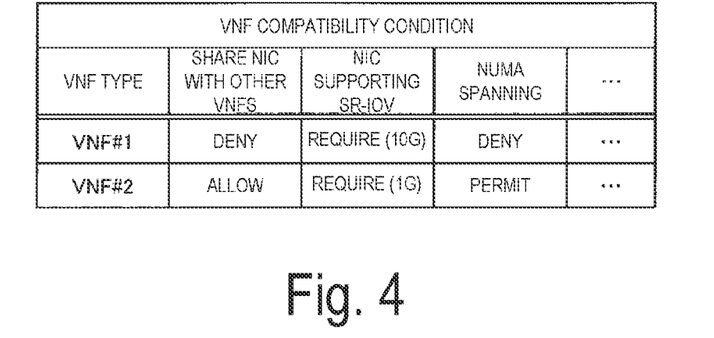
FIG. 4 is a diagram illustrating an example of a VNF compatibility condition in FIG. 1.

For example, as illustrated in FIG. 4, the VNF compatibility condition is information indicating, for each type of VNF, whether NICs can be shared with other VNFs or not, whether an NIC supporting Single Root I/O Virtualization (SR-IOV) is required or not, and in a case where an NIC supporting SR-IOV is required, how much capacity is required, whether Non-Uniform Memory Access (NUMA) spanning is permitted or not, and the like.

For example, the VNF compatibility condition illustrated in FIG. 4 indicate that a VNF of the VNF type "VNF #1" is not allowed to share an NIC with other VNF, requires 10G of NIC supporting SR-IOV, and is not permitted to perform the NUMA spanning. The VNF compatibility condition indicates that a VNF of the VNF type "VNF #2" is allowed to share an NIC with other VNFs, requires 1G of NIC supporting SR-IOV, and is permitted to perform the NUMA spanning.

The VIM 15 in FIG. 2 allocates resources to the VNF. For example, the VIM 15 allocates resources to the VNF to be additionally installed on the basis of the instruction from the VNF deploy control unit 14.

Figure 5:
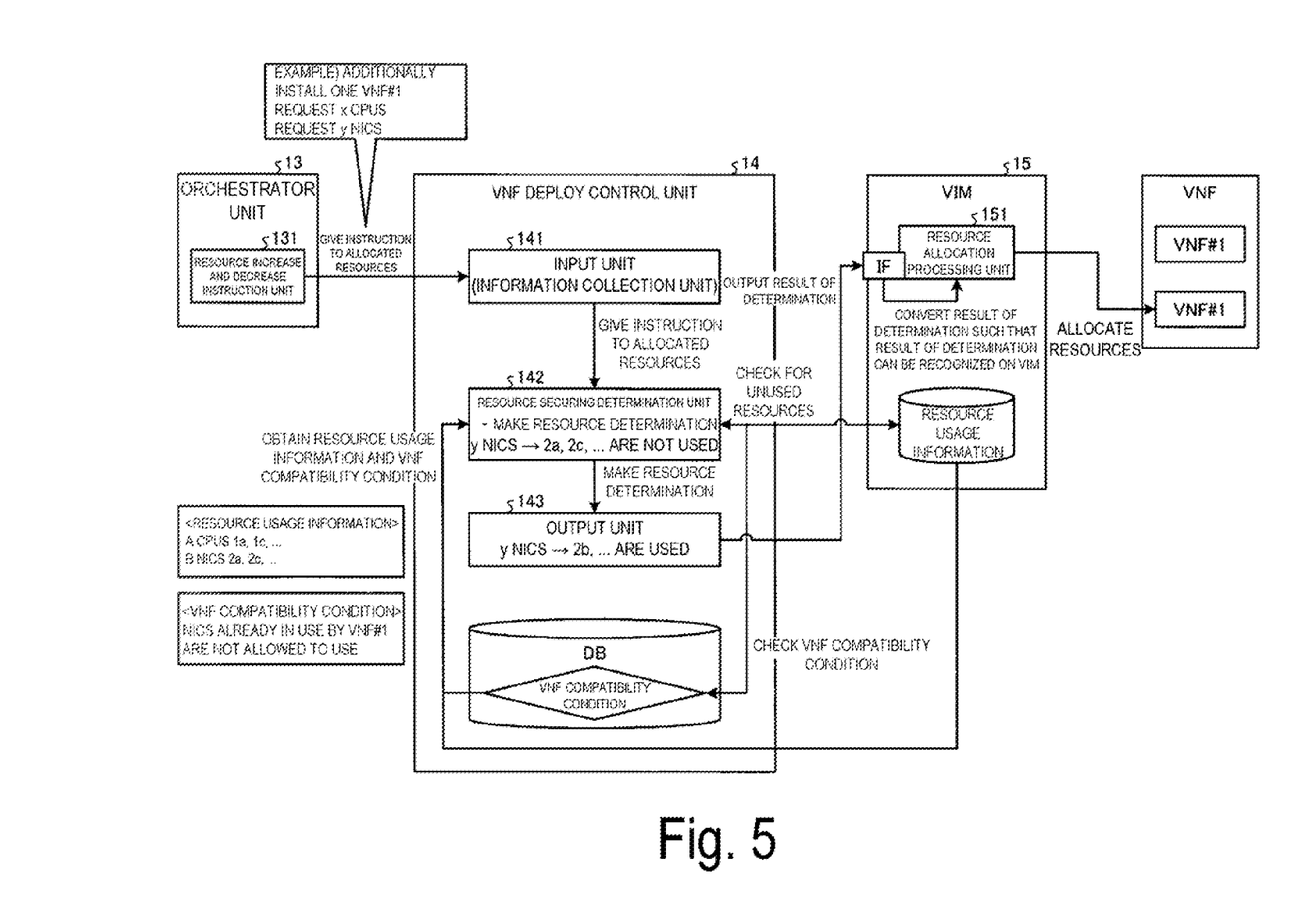
FIG. 5 is a diagram illustrating an orchestrator unit, a VNF deploy control unit, and a VIM in FIG. 1 in detail.

Now, by using FIG. 5, the orchestrator unit 13, the VNF deploy control unit 14, and the VIM 15 will be described in detail. Here, as an example, a case will be described in which the orchestrator unit 13 receives, from the resource control unit 12, an instruction to additionally install one VNF of the VNF #1.

The orchestrator unit 13 includes a resource increase and decrease instruction unit 131. The resource increase and decrease instruction unit 131 gives an instruction to increase or decrease a VNF. For example, when receiving instruction to additionally install the resources from the resource control unit 12, the resource increase and decrease instruction unit 131 gives the VNF deploy control unit 14 an instruction to allocate resources used by the VNF to be additionally installed on the basis of the template (see FIG. 2).

This resource allocation instruction includes, for example, the type of the VNF to be additionally installed (for example, the VNF #1), the number of VNFs to be additionally installed, the type of resources needed to additionally install the VNF, and the amount of resources needed to additionally install the VNF. For example, when determining, on the basis of the template, that x CPUs and y NICs are needed to additionally install one VNF #1, the resource increase and decrease instruction unit 131 outputs, to the VNF deploy control unit 14, a resource allocation instruction to allocate (secure) x CPUs and y NICs in order to additionally install the VNF #1.

The VNF deploy control unit 14 includes an input unit (information collection unit) 141, a resource securing determination unit 142, and an output unit 143.

The input unit 141 inputs, to the resource securing determination unit 142, a resource allocation instruction output from the orchestrator unit 13. In response to receiving the resource allocation instruction, the resource securing determination unit 142 references the type of the VNF to be additionally installed, the VNF compatibility condition, and the resource usage information, and determines, from among unused resources, resources allocated to the VNF to be additionally installed.

Note that the above-described resource usage information is information indicating resources in use by the VNF and unused resources. The resource usage information is stored, for example, in a storage unit (not illustrated) in the VIM 15.

For example, the resource securing determination unit 142 obtains information on the resource usage (information regarding resources in use) from the resource usage information in the VIM 15, and obtains the VNF compatibility condition (VNF compatibility condition for the resources in use) from the DB of the VNF deploy control unit 14. For example, the resource securing determination unit 142 obtains information regarding the resources indicating that resources in use are "A CPUs $1a$, $1c$, . . . , B NICs $2a$, $2c$, . . . ". Note that $1a$, $1c$, . . . described above are identification information of the CPU (cores), and $2a$, $2c$, . . . described above are identification information of the NICs. For example, the resource securing determination unit 142 obtains the VNF compatibility condition that "NICs already used by the VNF #1 are not allowed to use".

Then, the resource securing determination unit 142 makes resource determination on the basis of the obtained resource usage information and VNF compatibility condition. For example, the resource securing determination unit 142 determines that $2a$, $2c$, . . . are not used as the y NICs indicated in the resource allocation instruction. Next, the resource securing determination unit 142 references the resource usage information to check for unused resources. The resource securing determination unit 142 checks the VNF compatibility condition for the VNF to be additionally installed. Then, the resource securing determination unit 142 determines, from among the unused resources described above (candidates for resources allocated to the VNF to be additionally installed), resources that satisfy the VNF compatibility conditions for the VNF #1 and the VNF to be additionally installed. Here, because the VNF to be additionally installed is also of the VNF #1, the resource securing determination unit 142 determines, on the basis of the VNF compatibility condition for the VNF #1, for example, that $2b$, . . . are used as the y NICs allocated to the VNF to be additionally installed.

The output unit 143 outputs, to the VIM 15, the result of the determination made by the resource securing determination unit 142. For example, the VIM 15 outputs, to the VIM 15, the result of the determination indicating that $2b$, . . . are used as the y NICs allocated to the VNF to be additionally installed.

The VIM 15 includes a resource allocation processing unit 151. The VIM 15 also includes the resource usage information. The resource allocation processing unit 151 allocates resources to the VNF to be additionally installed on the basis of the result of the determination output from the VNF deploy control unit 14.

For example, an interface (IF) provided in the VIM 15 converts the result of the determination output from the VNF deploy control unit 14 such that the result of the determination can be recognized by the VIM 15. Then, the resource allocation processing unit 151 allocates resources to the VNF to be additionally installed on the basis of the result of the determination converted by the IF. For example, the resource allocation processing unit 151 allocates the y NIC $2b$, . . . as resources for the VNF to be additionally installed (second VNF #1). This allows the control system 10 to allocate appropriate resources to the VNF to be additionally installed (second VNF #1).

Figure 6:
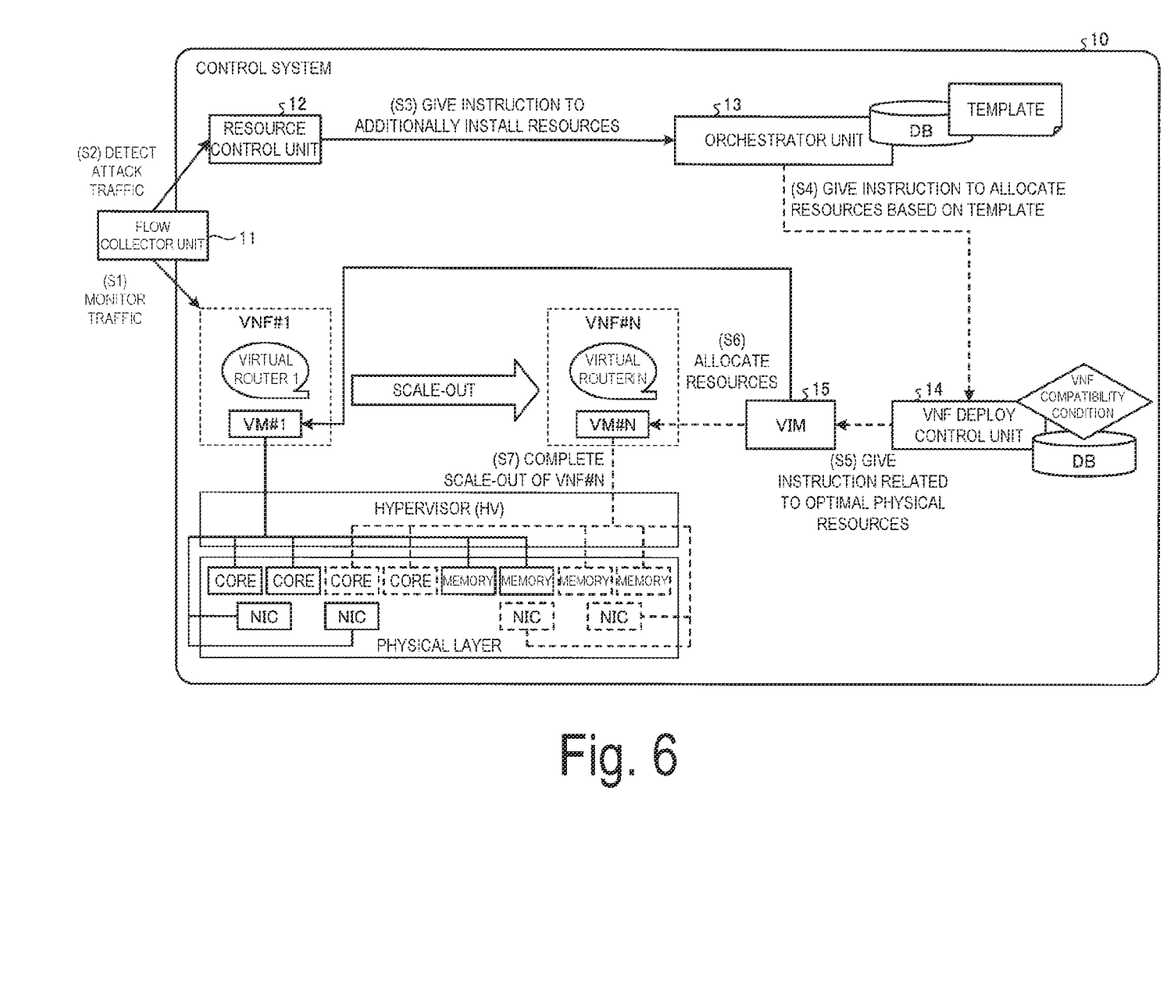
FIG. 6 is a diagram illustrating an example of scale-out in a case where a VNF is a virtual router of a different vendor.

Note that, in a case where the existing VNF (virtual router 1 (VNF #1)) and the VNF to be additionally installed (virtual router N (VNF #N)) are products of different vendors, the VNF compatibility condition for these VNFs indicates, for example, that "the NIC for the VNF does not overlap NICs for the other VNFs". Thus, the control system 10 allocates the virtual router N (VM #N) with an NIC that is different from the NIC allocated to the virtual router 1 (VM #1), as illustrated in FIG. 6. In this way, the control system 10 can achieve scale-out that meets the VNF compatibility condition for the VNF.

Other Embodiments

Note that in the control system 10, when performing scale-out of the VNF, the VNF deploy control unit 14 may determine, on the basis of the VNF compatibility condition, the optimal physical resource conditions for the VNF to be additionally installed and then may modify the VNF configuration file on the basis of the result of the determination of the optimal physical resource conditions. An embodiment in this case will be described using FIG. 7. Components that are the same as those in the first embodiment described above are denoted with the same reference signs, and the description of the components is omitted.

Figure 7:
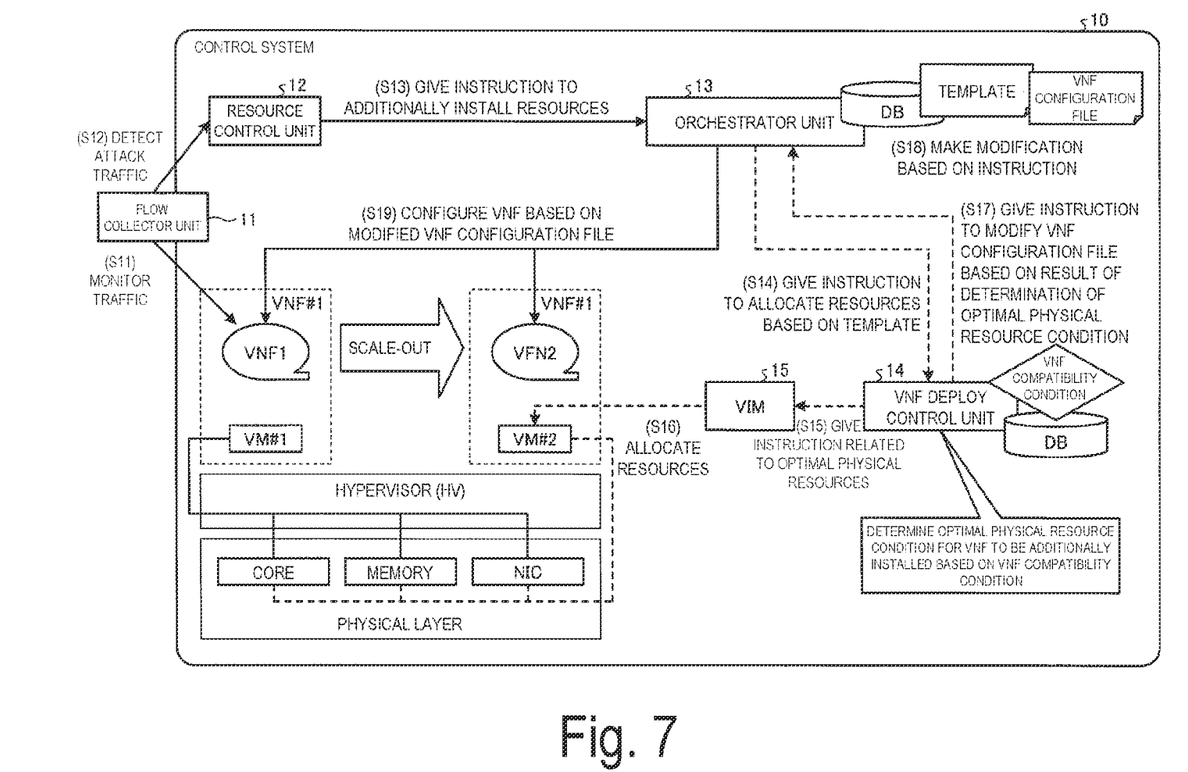
FIG. 7 is a diagram illustrating a modified example of the control system in FIG. 1.

The processing in S11 to S16 in FIG. 7 is similar to processing in S1 to S6 in FIG. 1. Thus, description of this processing is omitted, and the following description starts with S17 in FIG. 7. When the optimal physical resource conditions for the VNF to be additionally installed is determined, on the basis of the VNF compatibility condition in S15, the VNF deploy control unit 14 outputs, to the orchestrator unit 13, an instruction to modify the VNF configuration file based on the result of the determination of the optimal physical resource conditions (S17). Then, the orchestrator unit 13 modifies the VNF configuration file in response to the instruction (S18: modified on the basis of the instruction). Subsequently, the orchestrator unit 13 configures the VNFs (VNF 1 and VNF 2) on the basis of the modified VNF configuration file (S19).

For example, assume that, after a virtual router vMX is installed, the control system 10 additionally installs a virtual router vSR provided by a vendor different from the vendor of vMX.

Figure 8:
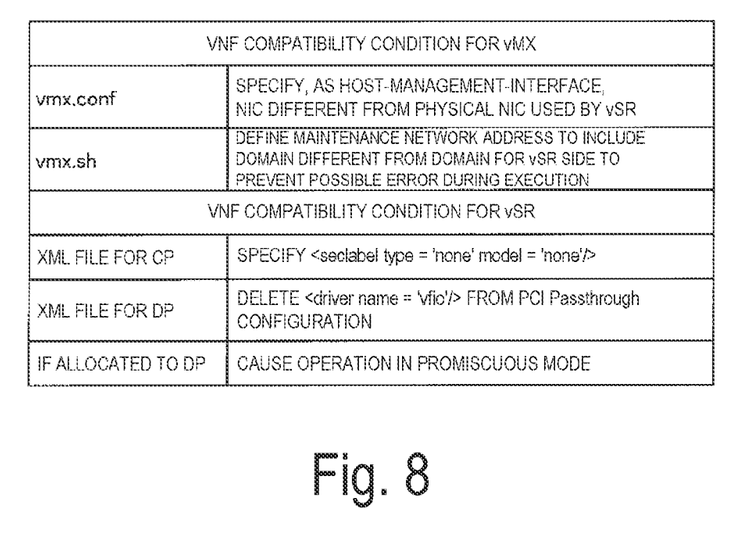
FIG. 8 is a diagram illustrating another example of the VNF compatibility condition.

As illustrated in FIG. 8, for example, the VNF compatibility condition for the vMX in this case is assumed that vmx.conf: specify, as Host-management-interface, an NIC different from a physical NIC used by the vSR and that vmx.sh: define a maintenance network address to include a domain different from a domain for the vSR side to prevent a possible error during execution. The VNF compatibility condition for the vSR indicates that an XML file for a control plane (CP): specify <seclabel type='none' model='none'/> and that an XML file for a data plane (DP): delete <driver name='vfio'/> from PCI Passthrough configuration and that an IF allocated to the DP: cause operation in a promiscuous mode.

In such a case, the VNF deploy control unit 14 instructs the orchestrator unit 13 to modify the VNF configuration files for the vMX and the vSR to "define the maintenance network address of the vMX to include a domain different from the domain for the vSR side".

The VNF deploy control unit 14 also instructs the orchestrator unit 13 to modify the VNF configuration file for the vSR such that "<seclabel type='none' model='none'/> is specified in the XML file for the CP" and that "<driver name='vfio'/> is deleted from PCI Passthrough configuration in the XML file for the DP" and that "the IF allocated to the DP is operated in the promiscuous mode".

In this way, the control system 10 can modify the VNF configuration file in response to the additional installation of the VNF and configure the VNF on the basis of the modified VNF configuration file.

When the control system 10 additionally installs the VNF, the VNF deploy control unit 14 may determine, on the basis of the VNF compatibility condition, the optimal physical resource conditions for the VNF to be additionally installed, and after that, may modify the template on the basis of the result of the determination of the optimal physical resource conditions. In this way, the control system 10 can accumulate templates with the VNF compatibility condition taken into account.

Program

A program that enables the functions of the control system 10 described in the embodiments above can be implemented by installing the program on a desired information processing device (computer). For example, an information processing device can be caused to function as the control system 10, with the above-described program, provided as package software or online software, executed by the information processing device. Examples of the information processing device as used herein include a desktop or notebook personal computer and a rack-mounted server computer. The category of the information processing device includes mobile communication terminals such as a smart phone, a mobile phone, and a Personal Handyphone System (PHS), as well as a Personal Digital Assistant (PDA). The control system 10 may be implemented in a cloud server.

Figure 9:
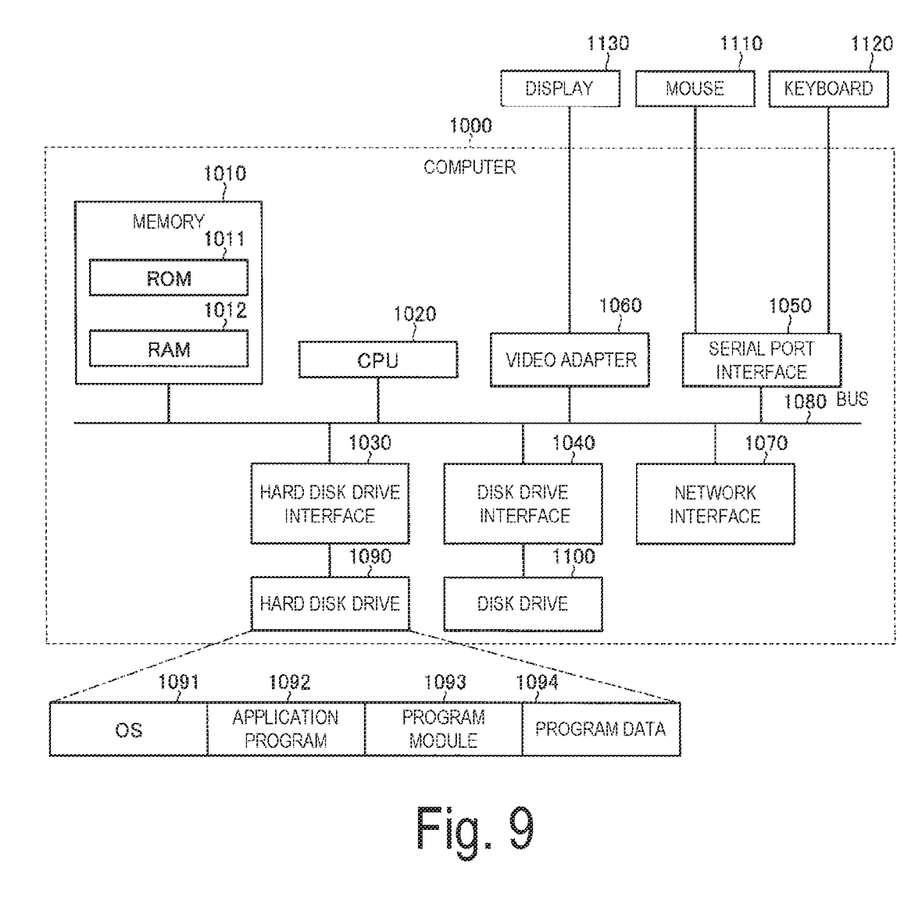
FIG. 9 is a diagram illustrating an example of a computer executing a control program.

An example of a computer that executes the program (control program) described above will be described with reference to FIG. 9. As illustrated in FIG. 9, a computer 1000 includes, for example, a memory 1010, a CPU 1020, a hard disk drive interface 1030, a disk drive interface 1040, a serial port interface 1050, a video adapter 1060, and a network interface 1070. These units are connected by a bus 1080.

The memory 1010 includes Read Only Memory (ROM) 1011 and a Random Access Memory (RAM) 1012. The ROM 1011 stores a boot program, such as Basic Input Output System (BIOS), for example. The hard disk drive interface 1030 is connected to a hard disk drive 1090. The disk drive interface 1040 is connected to a disk drive 1100. A removable storage medium, such as a magnetic disk or an optical disk for example, is inserted into the disk drive 1100. A mouse 1110 and a keyboard 1120, for example, are connected to the serial port interface 1050. A display 1130, for example, is connected to the video adapter 1060.

Here, the hard disk drive 1090 stores, for example, an OS 1091, an application program 1092, a program module 1093, and program data 1094 as illustrated in FIG. 9. The various types of data and information described in the aforementioned embodiments are stored in, for example, the hard disk drive 1090 and the memory 1010.

The CPU 1020 loads the program module 1093 and the program data 1094, stored in the hard disk drive 1090, onto the RAM 1012 as necessary, and executes each of the aforementioned procedures.

The program module 1093 or the program data 1094 related to the control program described above is not limited to the case where they are stored in the hard disk drive 1090. For example, the program module 1093 or the program data 1094 may be stored in a removable storage medium and read out by the CPU 1020 via the disk drive 1100 or the like.

Alternatively, the program module 1093 or the program data 1094 related to the above-described program may be stored in another computer connected via a network such as a LAN or a Wide Area Network (WAN) and read by the CPU 1020 via the network interface 1070.

REFERENCE SIGNS LIST

10 Control system
11 Flow collector unit
12 Resource control unit
13 Orchestrator unit
14 VNF deploy control unit
15 VIM
131 Resource increase and decrease instruction unit
141 Input unit
142 Resource securing determination unit
143 Output unit
151 Resource allocation processing unit

The invention claimed is:

1. A control device configured to perform allocation of a plurality of resources of a single computer to a first Virtual Network Functions (VNF) of a plurality of VNFs to be additionally installed on the single computer, the control device comprising one or more processors configured to:
store, a plurality of templates for the VNFs, each template of the plurality of VNFs comprising (i) a VNF compatibility condition indicating a condition for allocation of first resources of the plurality of resources allowed for the first VNF corresponding to coexist with a another VNF of the plurality of VNFs in the single computer, ii resource usage information indicating second resources of the plurality of resources that are used by the other VNF in the single computer and unused resources of the plurality of resources in the single computer;
monitor traffic to the first VNF;
determine the monitored traffic to the first VNF exhibits an attack;
in response to determining the monitored traffic to the first VNF exhibits the attack, determine an additional resource amount is needed for the first VNF;
select, from the plurality of templates for the VNFs, a template that corresponds to a type of the first VNF, the selected template comprising, the type of the first VNF to be additionally installed, the VNF compatibility condition, and the resource usage information;
determine, from among the unused resources indicated in the selected template, allocation resources of the plurality of resources allocated to the first VNF to be additionally installed, wherein the determined allocation resources satisfy the VNF compatibility condition of the selected template; and
allocate the determined allocation resources to the first VNF for handling the monitored traffic that exhibits the attack.

2. The control device according to claim 1, wherein the allocation resources allocated to the first VNF include at least one of a Network Interface Card (NIC), a core, and a memory provided in the single computer.

3. The control device according to claim 2, wherein the VNF compatibility condition comprises, for the type of the first VNF, whether the first VNF is allowed to share an NIC with the other VNF in the single computer.

4. The control device according to claim 2, wherein the VNF compatibility condition comprises, for the type of the first VNF, whether a Non-Uniform Memory Access (NUMA) spanning by a core used by the first VNF is allowed.

5. The control device according to claim 1, wherein the one or more processors are configured to:
store, in the selected template of the first VNF, a VNF configuration file indicating contents of the first VNF;
modify the contents of the VNF configuration file for the first VNF to be additionally installed, based on the determined allocation resources that satisfy the VNF compatibility condition; and
configure, using the modified VNF configuration file, the first VNF according to the determined allocation resources.

6. A control method performed by a control device for performing allocation of a plurality of resources of a single computer to a first Virtual Network Functions (VNF) of a plurality of VNFs to be additionally installed on the single computer, the control method comprising:
storing a plurality of templates for the VNFs, each template of the plurality of VNFs comprising (i) (i) a VNF compatibility condition indicating a condition for allocation of first resources of the plurality of resources allowed for the first VNF corresponding to coexist with a another VNF of the plurality of VNFs in the single computer, ii resource usage information indicating second resources of the plurality of resources that are used by the other VNF in the single computer and unused resources of the plurality of resources in the single computer;
monitoring traffic to the first VNF;
determining the monitored traffic to the first VNF exhibits an attack;
in response to determining the monitored traffic to the first VNF exhibits the attack, determining an additional resource amount is needed for the first VNF;
selecting, from the plurality of templates for the VNFs, a template that corresponds to a type of the first VNF, the selected template comprising the type of the first VNF to be additionally installed, the VNF compatibility condition, and the resource usage information;
determine, from among the unused resources indicated in the selected template, allocation resources of the plurality of resources allocated to the first VNF to be additionally installed, wherein the determined allocation resources satisfy the VNF compatibility condition of the selected template; and
allocating the determined allocation resources to the first VNF for handling the monitored traffic that exhibits the attack.

7. The method according to claim 6, wherein the allocation resources allocated to the first VNF include at least one of a Network Interface Card (NIC), a core, and a memory provided in the single computer.

8. The method according to claim 7, wherein the VNF compatibility condition comprises, for the first VNF, whether the first VNF is allowed to share an NIC with the other VNF in the single computer.

9. The method according to claim 7, wherein the VNF compatibility condition comprises, for the type of the first VNF, whether a Non-Uniform Memory Access (NUMA) spanning by a core used by the first VNF is allowed.

10. The method according to claim 6, further comprising:
storing, in the selected template of the first VNF, a VNF configuration file indicating contents of the first VNF;

modifying the contents of the VNF configuration file for the first VNF to be additionally installed, based on the determined allocation resources that satisfy the VNF compatible condition; and configuring, using the modified VNF configuration file, the first VNF according the determined allocation resources.

\* \* \* \* \*